R. G. ADAMS.
RECEPTACLE CLOSURE.
APPLICATION FILED SEPT. 15, 1909.
950,887.
Patented Mar. 1, 1910.
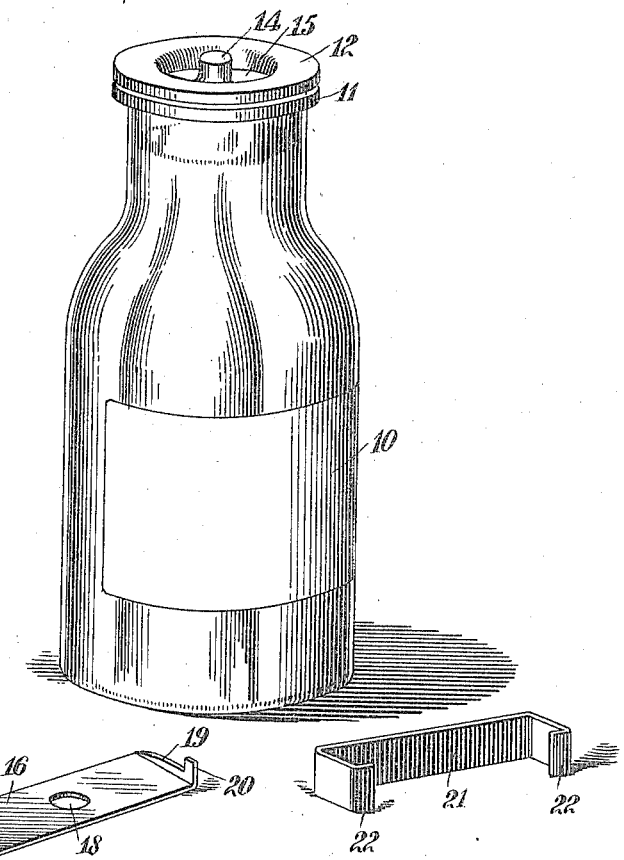
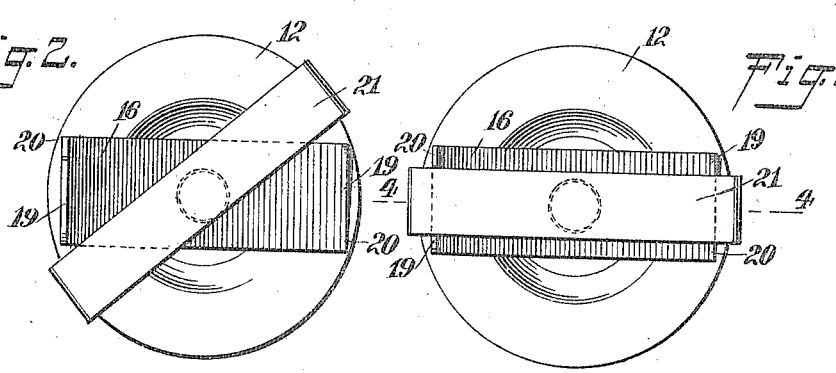
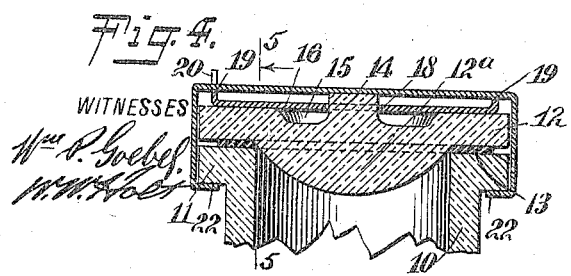
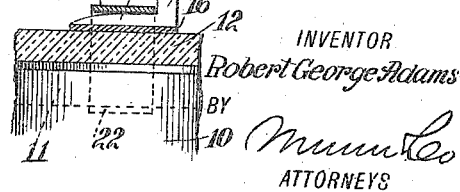
INVENTOR
Robert George Adams
BY
Munn & Co
ATTORNEYS

UNITED STATES PATENT OFFICE.

ROBERT GEORGE ADAMS, OF HAYWARD, CALIFORNIA.

RECEPTACLE-CLOSURE.

950,887.  Specification of Letters Patent.  Patented Mar. 1, 1910.

Application filed September 15, 1909. Serial No. 517,818.

*To all whom it may concern:*

Be it known that I, ROBERT GEORGE ADAMS, a subject of the King of Great Britain, and a resident of Hayward, in the county of Alameda and State of California, have invented a new and Improved Receptacle-Closure, of which the following is a full, clear, and exact description.

The invention is an improvement in closures for such receptacles as bottles, jars, etc. and belongs to that class of such devices in which a bail extending across the cover and in engagement with an external flange or shoulder around the neck of the bottle, is adapted to be engaged by reversely-arranged cams carried on a member revolubly supported on the cover and through this member force the cover to its seat.

The object of the invention is to construct the closure so that the bail and the cam member may be turned relatively to each other and to the cover and receptacle, whereby the parts may be easily and expeditiously assembled, and, further, to so construct the bail and cam member that they may be stamped from sheet metal and the cost of manufacture thus brought within the limits of practice.

Reference is to be had to the accompanying drawings forming a part of this specification, in which similar characters of reference indicate corresponding parts in all the views.

Figure 1 is a perspective view of a bottle having my improvements, with the cam member and bail removed and shown in detail; Fig. 2 is a plan of the closure, with the cam member and bail in unlocked positions; Fig. 3 is a similar view, with the cam member and bail locked, operating to force the cover to its seat; Fig. 4 is a section on the line 4—4 of Fig. 3; and Fig. 5 is a section on the line 5—5 of Fig. 4.

10 represents any receptacle, ordinarily a glass bottle or jar, having an external flange or shoulder 11 at the neck and a cover 12 of like material seating thereon, with an interposed gasket 13, the cover being of substantially the same diameter as the flange 11, both of which have opposed flat faces. The under side of the cover is preferably constructed with a centrally-swelled or projecting portion 12ª, the base or margin of which is approximately equal in diameter to the internal diameter of the mouth of the receptacle and serving to centrally locate the cover when it is applied. The opposite and upper side of the cover is constructed with a central projection 14 surrounded by an annular recess 15, the upper face of the cover outwardly from the recess being flat and arranged in a plane intermediate the bottom of the recess and the top of the stud or projection 14.

A cam member 16 is provided with a central opening 18 of a size to fit over the stud 14, and is provided at each end with reversely-arranged cams 19, 19, with a stop projection 20 arranged at the highest point or terminus of each cam. A bail 21 is adapted to seat on the top of the stud 14 and extends across the cover, the opposite end portions of the bail being downwardly turned and provided with inwardly-turned fingers 22 adapted to engage the under side of the flange 11. Both the cam member and the bail are preferably constructed of sheet metal, enabling the manufacture of the closure to be carried out at relatively low cost, thus, the cam member will present a flat strip having a hole punched at the center and the ends cut out to form the cams and stop projections and turned upwardly. The bail will likewise present a flat strip having the end portions turned downwardly, with the extremities thereof turned inwardly.

In assembling the closure the cover is seated on the top of the receptacle, with the gasket between them and the bail moved laterally over the cover in engagement with the flange of the receptacle after the cam member is engaged over the stud, the bail frictionally binding on the top of the stud, which primarily prevents the bail from being accidentally displaced. As the bail and cam member may each be turned relatively to each other and to the cover of the receptacle no special precaution need be taken on what diameter of the cover the bail be placed. With the bail diametrically extending across the cover and receptacle, the cam member is revolved to force the cams 19 under the bail and thus firmly press the cover to its seat. By reason of the flat strip of which the cam member is made, seating flat on the top of the cover at the cams and the latter being positioned close to the edge of the cover, the strain on the cam member and bail will be effectually resisted by the relatively thin metal of which these parts are made.

Having thus described my invention, I claim as new and desire to secure by Letters Patent:

1. The combination of a receptacle having an external shoulder at the neck thereof, a cover seated on the receptacle, a member supported on the top of the cover and revoluble independently thereof, said member having upwardly-projecting cams at the opposite sides of the center of the cover, reversely arranged, and a bail separate from the member and revoluble relatively thereto and to the cover and adapted to engage under the flange and be engaged by the said cams.

2. The combination of a receptacle having an external flange at the mouth thereof, a cover seated on the receptacle, having a centrally-arranged stud projecting from its upper face, a member revoluble on the stud, having upwardly-projecting cams at the margin of the cover, and a bail extending across the cover in engagement with the under side of the flange and adapted to be supported on the stud and be engaged by the cams of said member to press the cover to the receptacle.

In testimony whereof I have signed my name to this specification in the presence of two subscribing witnesses.

ROBERT GEORGE ADAMS.

Witnesses:
J. G. DELGADO,
A. O. BUSH.